Nov. 17, 1959  W. L. McGRATH  2,912,833
HEATING AND COOLING APPARATUS
Filed Jan. 10, 1958

INVENTOR.
WILLIAM L. McGRATH
BY Herman Seid
Atty.

2,912,833
Patented Nov. 17, 1959

2,912,833
HEATING AND COOLING APPARATUS

William L. McGrath, Syracuse, N.Y., assignor to Carrier Corporation, Syracuse, N.Y., a corporation of Delaware Application January 10, 1958, Serial No. 708,163

2 Claims. (Cl. 62—229)

This invention relates to air conditioning apparatus. More particularly this invention relates to air conditioning equipment embodying a refrigeration system which may be selectively operated to heat and cool an enclosure.

While the invention is primarily useful with a refrigeration system operable under the well known reverse cycle principle commonly called "heat pumps" it may also be used with air conditioning equipment where flow of refrigerant through the refrigeration system is not reversed but where the flow paths of the media flowing over the heat transfer coils in the system are manipulated by suitable dampers, to create a cooling or heating effect to the medium being supplied to the enclosure served by the equipment.

Heat pumps, as apparatus of this general type has been commonly known, have not been too widely used in geographical areas such as the northern parts of the United States where relatively low ambient temperatures are encountered during the winter season when the requirement for heating is greatest. Efforts to overcome the problem of supplying additional heat to an enclosure have resulted in utilization of supplementary heating means such as strip heaters which, in effect, operate as resistance heating elements.

During the season of the year when it is required that the heat pump supply to the enclosure being served, a supply of heat sufficient to satisfy the load on the house it has been found that apparatus designed to satisfy the cooling load on the enclosure often is incapable of providing or satisfying the heating load on the enclosure. This is true primarily because of the additional temperature lift required to provide comfortable conditions within the enclosure during the heating season.

Also conventional heat pumps of the kind under consideration are able to use only a small part of the total electrical capacity or supply available at the source of installation of the heat pump at low outside temperatures when the heating load is highest. It is therefore a primary object of the invention to provide a heat pump that may effectively utilize the maximum amount of available electricity during operation of the unit at low ambient or outdoor temperatures.

It is a further object of the invention to provide apparatus for heating and cooling an enclosure which includes a heat pump arranged so that substantially equivalent amounts of electrical power or input are utilized when the unit is operating on the cooling cycle at maximum load conditions, on cooling at rating conditions or on heating at low outside temperatures.

A still further object of the invention is the provision of a system for heating and cooling a space by means of apparatus operable under the heat pump or reverse cycle principle which will deliver a maximum amount of heat to the space or enclosure under conditions of winter design temperature without exceeding the supply of electrical current dictated by maximum loading conditions on the cooling cycle.

This invention has for another object the provision of a heat pump equipped with a compressor, the output of which may be varied during the heating season when the ambient temperatures encountered reach a predetermined low value. Thus the compressor has the inherent potential of satisfying both the heating load and the cooling load despite the fact that substantial differences in the degree of performance during the two seasons are involved.

Another object of this invention involves an arrangement for the compressor of a heat pump which will permit increased cooling to be obtained during operation of the heat pump on the cooling cycle.

In attaining the objects of this invention, a heat pump is provided wherein the compressor is provided with means for varying the clearance of at least one cylinder in order to regulate or control the volumetric efficiency of the compressor. Thus, when it is required that the compressor provide a substantial temperature lift, the apparatus is automatically operated to fulfill this need.

Other advantages and objects of this invention will be apparent upon a consideration of the ensuing specification and drawings in which:

Figure 2 is a graphic representation of the relationships between the power consumption, system capacity and heating characteristics of a conventional heat pump as they vary with respect to outside temperature; and Figure 3 is a graphical representation of the relationships shown in Figure 2 revised to illustrate the performance of the heat pump constructed in accordance with this invention.

Figure 1:
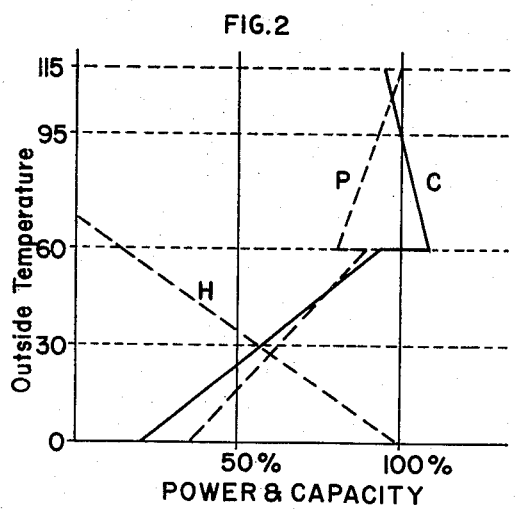
Figure 1 is a diagrammatic view of a heat pump constructed in accordance with this invention.
Figure 1:
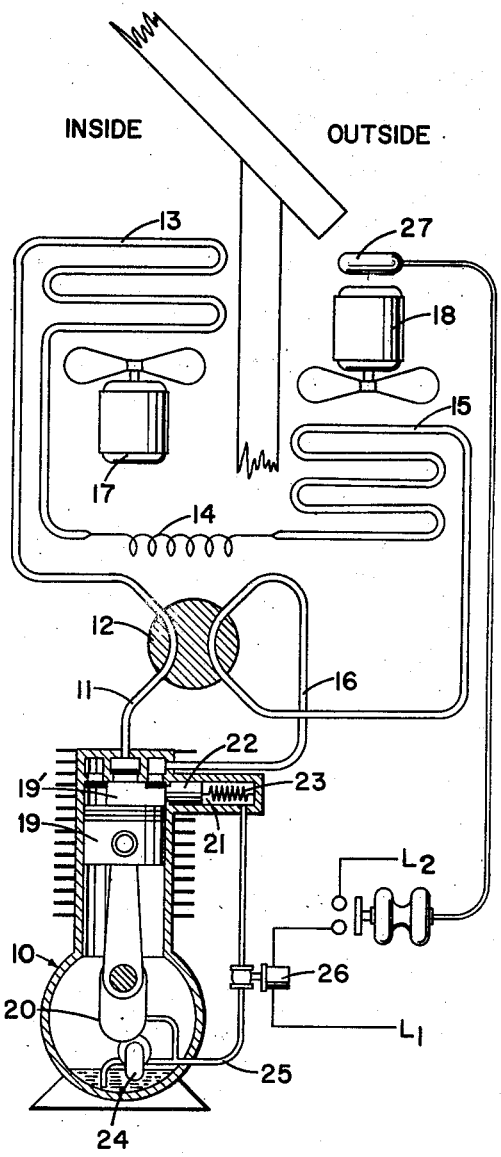

Referring to Figure 1, a heat pump of the type to which this invention pertains is illustrated diagrammatically. It will be observed that the system illustrated is more commonly known as an air-to-air, two-piece heat pump.

Compressor 10 of the fluid displacement type forwards hot gaseous refrigerant through discharge line 11 to a four way reversing valve 12, to an inside coil 13 when the unit is operating on the heating cycle. The gaseous refrigerant in the coil 13 is liquified as air within the enclosure is circulated over the coil through the action of fan 17. Liquid refrigerant flows through capillary 14, or other suitable expansion device, to an outside coil 15. Here, heat is extracted from the ambient air and the refrigerant therein vaporized. Ambient air is delivered over the surface of the coil through the action of fan 18. The gaseous refrigerant then flows through the reversing valve 12, suction line 16, to the fluid displacement compressor 10 to complete the cycle.

When it is desired to operate the unit on the cooling cycle, reversing valve 12 is indexed through a control (not shown) so that the hot gaseous refrigerant flowing in line 11 is directed to the coil 18. From the coil it flows through the expansion device 14 to the indoor coil 13 where heat is extracted from the air flowing over the coil, vaporizing the refrigerant. Vaporous refrigerant then flows through the four way valve into line 16 and into the compressor 10.

Referring more particularly to the compressor 10, it will be noted that a piston 19 is disposed in cylinder 19' of the compressor and is connected operatively to a crankshaft 20 in the usual conventional manner. Located adjacent the cylinder 19' is chamber 21 having a movable valve or block element 22. The movable element 22 is normally urged under the action of tension spring 23 to the right so as to permit a substantial portion of the volume of chamber 21 to be in communication with the cylinder 19'. With the parts arranged in the position described, operation of the unit under the cooling cycle as well as a substantial part of the heating cycle may be effected.

Lubrication for the moving parts of the compressor is under the influence of a pump 24. A branch line 25 of the lubrication circuit connects with the chamber 21 and flow through the branch line 25 is under the control of valve 26. Normally closed valve 26 is operative in response to mechanism sensing the temperature of the ambient air flowing under the influence of fan 18 over coil 15.

Considering the operation of the heat pump, as indicated above, valve or element 22 assumes its retracted position when the temperature of the air being introduced over the coil 15 is in excess of 30° F. Under these circumstances the valve 22 is in its normally retracted position permitting cylinder 19″ to have a relatively large clearance. Under these circumstances, the volumetric efficiency of the compressor is such that the temperature lift under cooling operating conditions may be satisfied while the compressor inherently is capable of satisfying the relatively steeper temperature lift encountered on the heating cycle. The term temperature lift as employed here refers to the difference between the evaporator temperature and the condensing temperature under a given design cooling condition or under a given design heating condition.

When it is desired to operate the heat pump on the heating cycle, as for example under those circumstances where the ambient temperature may drop below 70° F., the reversing valve 14 is indexed so that gaseous refrigerant is free to flow from discharge line 11 to the inside coil 13. As long as the ambient temperature is maintained above 30° or any desired outdoor temperature the compressor 10 operates with the same volumetric efficiency as it did on the cooling cycle. It will be appreciated of course that the temperature lift involved is relatively greater as the ambient drops so that the capacity of the compressor decreases.

When the outdoor temperature reaches 30° the unit is operating on the heating cycle, with valve 26 opened, through the action of the thermostatically controlled switch 27, and the bellows 27′, permitting oil under pressure in the lubrication circuit of the machine to flow into chamber 21. As the pressure builds up in chamber 21, the block or valve 22 is moved against the action of tension spring 23 to the position shown in Figure 1. The cylinder clearance in the machine is now reduced so that the volumetric efficiency of the compressor is increased. This permits the compressor to attain the required lift between the low side and the high side of the system with substantially more capacity. Further the system requirement for heating is more nearly satisfied as will be later apparent.

When the outside air temperature exceeds 30° or any other convenient setting of the thermostat 27, the valve 26 closes, trapping within the chamber and that portion of the branch line 25 between the valve and the chamber, a quantity of oil. However the parts are so proportioned that oil leakage occurs around the valve 22 so that eventualy the valve 22 is retracted under the influence of the spring 23 to its position under cooling cycle operation where the volumetric efficiency of the compressor is lower.

To graphically illustrate the savings involved in utilizing a compressor of the type described, reference is made to Figures 2 and 3. In Figure 2, for example, curve C represents the capacity of a conventional heat pump wherein the capacity is 100% at code conditions which involve a 95° outside temperature. It will be appreciated that during operation of the unit on the heating cycle, capacity drops to approximately 25% when 0° ambient temperature is reached. The curve C represents the capacity, and curve P the power expended.

Figure 3, however, represents conditions which are obtained by virtue of the invention described above. It will be noted that the capacity curve C′ is substantially the same as the capacity of curve C with the exception that 100% capacity occurs in the region of 115° ambient temperature as opposed to 95° ambient temperature. This condition reflects the effect of the increased clearance. As indicated above, when the ambient temperature reaches 30°, the volumetric efficiency of the compressor is increased as the clearance in the cylinder is decreased. Thus as the greater weight of refrigerant is pumped by the compressor, due to the decreased cylinder clearance, a greater volume of refrigerant at a relatively high temperature is presented to the indoor coil for liquification and extraction of heat. Thus it will be appreciated that the capacity rises in accordance with the horizontal portion of the curve at the 30° ambient temperature line of the curve represented in Figure 3. Further, with reference to the graph illustrated in Figure 3, it will be noted that the heat requirements of the system as indicated by the curve H′ are more nearly balanced with respect to the capacity of the heat pump and the power in the supply located at the installation of the unit is more effectively utilized. This reduces the necessity for the use of supplementary heating means such as the resistance heaters mentioned above.

Although the embodiment selected to illustrate the invention includes the arrangement for varying the compressor clearance illustrated in Figure 1, it will be apparent that other devices designed to perform this function may be used, if desired.

While I have described preferred embodiments of the invention, it will be understood the invention is not limited thereto since it may be otherwise embodied within the scope of the following claims:

I claim:

1. In apparatus for heating and cooling an enclosure, a refrigeration system comprising a compressor having at least one cylinder with a piston member therein, and a lubrication system, a first heat transfer coil located within the enclosure and a second heat transfer coil located outside the enclosure, connected to form a circuit for the flow of refrigerant, means for automatically adjusting the clearance in said compressor to vary the volumetric efficiency of the compressor, said means including a chamber in communication with said cylinder, a piston slidable in said chamber, spring means attached to said piston, a conduit connecting the compressor with the chamber for delivering lubricant to the chamber to oppose the action of said spring and regulating valve means in said conduit.

2. The invention set forth in claim 1 wherein valve means is operable in response to the temperature of the medium flowing over said outdoor coil.

References Cited in the file of this patent

UNITED STATES PATENTS

| 2,761,615 | Prince | Sept. 4, 1956 |
| 2,785,540 | Biehn | Mar. 19, 1957 |
| 2,833,462 | Scheerer | May 6, 1958 |